W. M. CASWELL & J. A. SCHOFIELD.
HAME FASTENER.
APPLICATION FILED NOV. 16, 1908.
961,935.
Patented June 21, 1910.
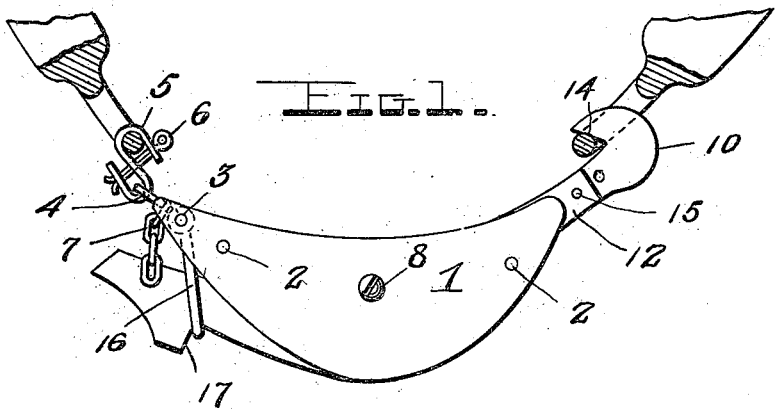
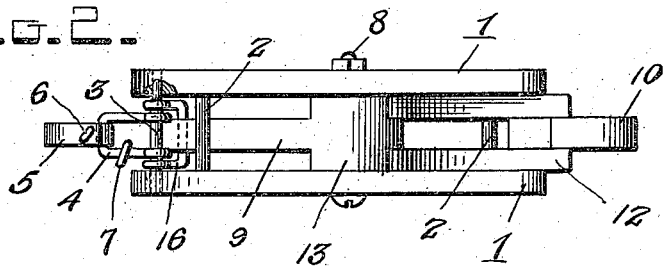
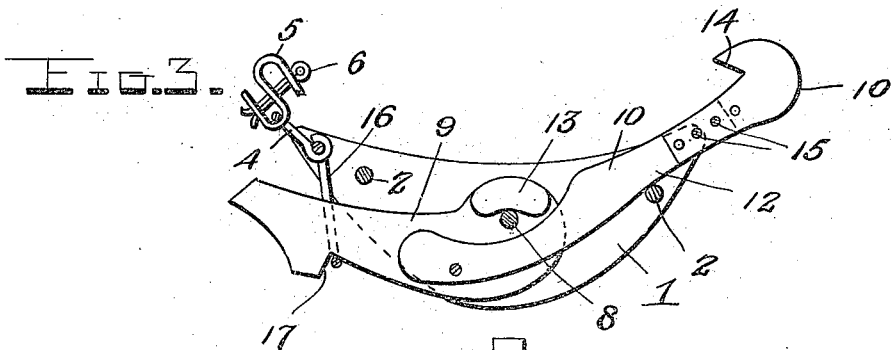
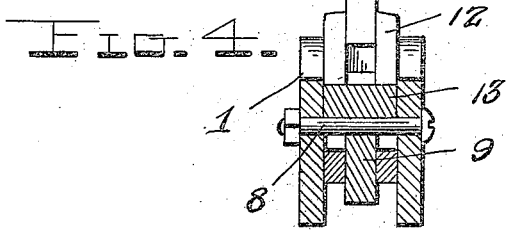
Witnesses
Chas. L. Griesbauer
C. H. Griesbauer
Inventors
Wm. M. Caswell and J. A. Schofield
By H. B. Willson & Co.
Attorneys

UNITED STATES PATENT OFFICE.

WILLIAM M. CASWELL AND JOSEPH A. SCHOFIELD, OF WARREN, PENNSYLVANIA.

HAME-FASTENER.

961,935. Specification of Letters Patent. Patented June 21, 1910.

Application filed November 16, 1908. Serial No. 462,939.

*To all whom it may concern:*

Be it known that we, WILLIAM M. CASWELL and JOSEPH A. SCHOFIELD, citizens of the United States, residing at Warren, in the county of Warren and State of Pennsylvania, have invented certain new and useful Improvements in Hame-Fasteners; and we do declare the following to be a full, clear, and exact description of the invention, such as will enable others skilled in the art to which it appertains to make and use the same.

This invention relates to improvements in hame fasteners.

The object of the invention is to provide a hame fastener which will be simple, strong and durable in construction, and by means of which the hames may be quickly and firmly secured to the collar, and having means whereby the same may be readily engaged with and released from the lower ends of the hames.

With this and other objects in view, the invention consists of certain novel features of construction, combination and arrangement of parts as will be described and particularly pointed out in the appended claim.

In the accompanying drawing, Figure 1 is a side view showing the manner of engaging the device with the hames; Fig. 2 is a top plan view of the fastener; Fig. 3 is a vertical longitudinal sectional view; and Fig. 4 is a vertical cross sectional view, taken on a line with the pivot of the operating lever.

In the embodiment of the invention we provide a supporting frame which preferably consists of a pair of segmental plates, 1, which are spaced apart and held together in parallel relation by means of connecting bars, 2, arranged thereon adjacent to their opposite ends. In one end of the frame is arranged a cross bar, 3, to which is connected an attaching link, 4, with which is engaged a hame attaching member, 5, which is preferably in the form of a double hook, the ends of which are held in operative engagement with the link, 4, and the end of one of the hames by a cotter-pin, 6, or other suitable fastening device. To the link, 4, is also connected a short chain or series of links, 7, with any one of which links the hame, 5, may be engaged to lengthen the connection between the fastener and the end of the hame when desired.

Midway between the opposite ends of the frame plates 1 is arranged a pivot bolt, 8, on which is pivotally mounted a cam operating lever, 9, to the cam-shaped head of which is eccentrically pivoted the inner end of a fastening member, 10, said member being preferably formed of parallel bars, 12, one of which is arranged on each side of the cam head of the operating lever.

The outer ends of the bars, 12, have formed therein a series of alined apertures and between said ends is secured a hame-engaging hook, 14, the shank of which is provided with one or more apertures which are adapted to be alined with certain of the apertures in the bars, 12, and through said apertures is inserted a fastening pin, or pins, 15, by means of which the hame is adjustably secured to the end of the fastening member.

The upper edges of the bars 12 of the fastening member 10 are recessed and are adapted to engage stop lugs 13 arranged on opposite faces of the cam head of the lever 9 when the latter is in operative position as shown in Figs. 1 and 3, and the hook 14 in hame engaging position, thus holding the fastening member 10 and lever 9 against relative movement.

The engagement of the inner ends of the bars, 12, of the fastening member with the cam head of the operating lever is such that when said lever is swung in one direction, the fastening member, 10, and hook, 14, will be projected or extended beyond the end of the frame, thus permitting the hook 14 to be readily engaged with or disengaged from the end of the adjacent hame. After the hook, 14, has been engaged with the end of the hame, the operating lever is swung around in the opposite direction to cause the cam head thereon to retract the fastening member and thereby draw the hame into tight engagement with the collar. After the lever has been operated to draw the hame into engagement with the collar, the lever is locked to hold the parts in this position by means of a bail, 16, which is pivotally connected with the cross bar, 3, and depends therefrom. The locking bail, 16, is prevented from becoming casually disengaged from the end of the operating lever by means of a lug, or stop, 17, which is formed on the lower side of the lever adjacent to its outer end.

In the arrangement of the parts as herein shown and described, the cross bar, 2, at one end of the frame serves as a support and guide for the fastening member when actuated by the operating lever. The cross bar, 2, at the opposite end of the frame serves as a stop to limit the upward movement of the outer end of the operating lever when the latter is swung into position for retracting the fastening member.

From the foregoing description, taken in connection with the accompanying drawing, the construction and operation of the invention will be readily understood without requiring a more extended explanation.

Having thus described our invention, what we claim as new and desire to secure by Letters-Patent, is:

A hame fastener comprising a supporting frame consisting of a pair of corresponding plates, an operating lever having a cam head, pivoted between said plates, a fastening member comprising a pair of parallel bars having recessed upper edges pivoted at their inner ends to the cam head of said lever, a hame engaging hook adjustably connected with the outer ends of said fastening bars, a bail pivoted to one end of the frame and adapted to engage and support the free end of the operating lever in operative position, means for connecting the adjacent end of the supporting frame with the adjacent hame, and stop lugs on opposite faces of the cam head of the operating lever adapted to engage the recessed upper edges of the bars of the fastening member when the hame hook is in hame engaging position.

In testimony whereof we have hereunto set our hands in presence of two subscribing witnesses.

WILLIAM M. CASWELL.
JOSEPH A. SCHOFIELD.

Witnesses:
JOHN E. WHEELER,
THADDEUS P. REIG.